United States Patent
Hunter, Jr. et al.

(10) Patent No.: US 9,287,011 B2
(45) Date of Patent: Mar. 15, 2016

(54) HIGH-YIELD ICF CONTAINMENT CHAMBERS AND POWER REACTORS

(75) Inventors: Robert O. Hunter, Jr., Aspen, CO (US); David H. Sowle, Santa Maria, CA (US); Conner D. Galloway, Oklahoma City, OK (US); Alexander V. Valys, Cromwell, CT (US)

(73) Assignee: INNOVEN ENERGY LLC, Colorado Springs, CO (US)

( * ) Notice: Subject to any disclaimer, the term of this patent is extended or adjusted under 35 U.S.C. 154(b) by 767 days.

(21) Appl. No.: 13/068,667

(22) Filed: May 17, 2011

(65) Prior Publication Data
US 2012/0002773 A1 Jan. 5, 2012

Related U.S. Application Data

(60) Provisional application No. 61/395,745, filed on May 17, 2010, provisional application No. 61/395,762, filed on May 17, 2010, provisional application No. 61/395,727, filed on May 17, 2010, provisional application No. 61/395,725, filed on May 17, 2010, provisional application No. 61/395,726, filed on May 17, 2010, provisional application No. 61/395,734, filed on May 17, 2010.

(51) Int. Cl.
| | |
|---|---|
| *G21B 1/13* | (2006.01) |
| *G21B 1/19* | (2006.01) |
| *G21B 1/03* | (2006.01) |
| *G21B 1/17* | (2006.01) |

(52) U.S. Cl.
CPC .. *G21B 1/03* (2013.01); *G21B 1/17* (2013.01); *Y02E 30/14* (2013.01)

(58) Field of Classification Search
CPC ................................. Y02E 30/14; G21B 1/03
USPC ......................................... 376/150, 102, 103
See application file for complete search history.

(56) References Cited

U.S. PATENT DOCUMENTS

| | | | | |
|---|---|---|---|---|
| 4,344,911 A | * | 8/1982 | Maniscalco et al. | 376/102 |
| 4,696,781 A | * | 9/1987 | Bourque | 376/136 |

OTHER PUBLICATIONS

Amendt et al., "Indirect-drive noncryogenic double-shell ignition targets for the National Ignition Facility: Design and analysis", Physics of Plasmas, vol. 9, No. 5, May 2002, 14 pgs.

Atzeni, Stefano, "A Survey of Studies on Ignition and Burn of Inertially Confined Fuels", Lasers and Inertial Fusion Energy, London, GBR, Imperial College Press, 2005, pp. 48-52.

Azechi et al., "Model for Cannonball-Like Acceleration of Laser-Irradiated Targets", Japanese Journal of Applied Physics, vol. 20, No. 7, Jul. 1981, pp. L477-L480.

(Continued)

*Primary Examiner* — Jack W Keith
*Assistant Examiner* — Sean P Burke
(74) *Attorney, Agent, or Firm* — Kilpatrick Townsend & Stockton LLP

(57) ABSTRACT

Cylindrical inertial confinement fusion reaction chambers are disclosed according to some embodiments of the invention. These chambers can include neutron moderating/absorbing material, radiation absorbing material, and debris collection material. These chambers can also include various injection ports, nozzles, beam ports, sacrificial layers, absorbers, coolant systems, etc. These chambers can be used with directional and/or omni-directional targets.

14 Claims, 11 Drawing Sheets

(56) References Cited

OTHER PUBLICATIONS

Basov et al., "Theory of heating and compression of double-shell spherical targets exposed to a laser pulse", Sov. J. Quantum Electron. 12 (10), Oct. 1982, pp. 1268-1273.
Bates et al., "Simulations of high-gain shock-ignited inertial-confinement-fusion implosions using less than 1 MJ of direct KrF laser energy", High Energy Density Physics, Dec. 3, 2009, 10 pgs.
Bodner, Stephen E., "Critical Elements of High Gain Laser Fusion", Journal of Fusion Energy, vol. 1, No. 3, May 14, 1981, pp. 221-240.
Brueckner et al., "Laser-driven fusion", Reviews of Modern Physics, vol. 46, No. 2, Apr. 1974, pp. 325-367.
Callahan-Miller et al., "A distributed radiator, heavy ion target driven by Gaussian beams in a multibeam illumination geometry", Nuclear Fusion, vol. 39, No. 7, 1995, pp. 883-891.
Caruso et al., "Physical Processes in a Laser-Greenhouse Target: Experimental Results, Theoretical Models, and Numerical Calculations", Journal of Russian Laser Research, vol. 21, No. 4, 2000, pp. 335-369.
Chen et al., "Stability of Imploding Spherical Shock Waves", Journal of Fusion Energy, vol. 14, No. 4, 1995, pp. 389-392.
Chu, M.S., "Thermonuclear Reaction Waves at High Densities", The Physics of Fluids, vol. 15, No. 3, Mar. 1972, 11 pgs.
Clarke et al., "Laser-Driven Implosion of Spherical DT Targets to Thermonuclear Burn Conditions", Physical Review Letters, vol. 30, No. 3, Jan. 15, 1973, pp. 89-92.
Eliezer et al., "The Physics of Directly Driven Targets", Nuclear Fusion by Inertial Confinement: A Comprehensive Treatise, 1993, pp. 43-71.
Fraley et al., "Implosion, Stability, and Burn of Multishell Fusion Targets", Los Alamos Scientific Laboratory of the University of California, Oct. 1974, 10 pgs.
Fraley et al., "Thermonuclear burn characteristics of compressed deuterium-tritium microspheres", The Physics of Fluids, vol. 17, No. 2, Feb. 1974, pp. 474-489.
Gardner et al., "Stability of imploding shocks in the CCW approximation", J. Fluid Mech., vol. 114, 1982, pp. 41-58.
Goldman, E.B., "Numerical Modeling of Laser Produced Plasmas: The Dynamics and Neutron Production in Dense Spherically Symmetric Plasmas", Plasma Physics, vol. 15, 1973, 23 pgs.
Haan et al., "Design and modeling of ignition targets for the National Ignition Facility", Phys. Plasmas 2 (6), Jun. 1995, 9 pgs.
Hora et al., "High-Gain Volume Ignition for Inertial Confinement Fusion (ICF)", American Institute of Physics, 1994, pp. 325-333.
Holzrichter, John F., "Lasers and Inertial Fusion Experiments at Livermore", Lawrence Livermore Laboratory Report, Jan. 2006, 35 pgs.
Kessler et al., "ICF-Reactors—Conceptual Design Studies", Nuclear Fusion by Inertial Confinement: A Comprehensive Treatise, 1993, pp. 673-723.
Kindel et al., "Double-Shell Target Designs for the Los Alamos Scientific Laboratory Eight-Beam Laser System", Los Alamos Scientific Laboratory of the University of California, Mar. 1978, 14 pgs.
Krauser et al., "Ignition target design and robustness studies for the National Ignition Facility", Phys. Plasmas 3 (5), May 1996, 11 pgs.
Lackner et al., "Equilibrium Ignition for ICF Capsules", 11th International Workshop on Laser Interaction and Related Plasma Phenomena, Oct. 1993, 9 pgs.
Lindl, John, "Development of the indirect-drive approach to inertial confinement fusion and the target physics basis for ignition and gain", Phys. Plasmas 2 (11), Nov. 1995, pp. 3933-4024.
Lindl et al., "The physics basis for ignition using indirect-drive targets on the National Ignition Facility", Physics of Plasmas, vol. 11, No. 2, Feb. 2004, pp. 339-491.
Lindl et al., "Two-Dimensional Simulation of Fluid Instability in Laser-Fusion Pellets", Physical Review Letters, vol. 34, No. 20, May 19, 1975, pp. 1273-1276.
Melville et al., "The Sorption of Hydrogen and Deuterium by Copper and Palladium. I. The Behaviour of Copper and Copper Oxides", Proceedings of the Royal Society, Jul. 5, 1935, 13 pgs.
Melville et al., "The Sorption of Hydrogen and Deuterium by Copper and Palladium. II. The Sorption by Palladium and Diffusion through Copper", Proceedings of the Royal Society, Jul. 5, 1935, 16 pgs.
Moyer, Michael, "Fusion's False Dawn", Scientific American 2010, pp. 34-41.
Nakai et al., "Nuclear aspects and design of an inertial confinement fusion reactor", Fusion Engineering and Design 16, 1991, 7 pgs.
Nishimura et al., "Radiation-driven cannonball targets for high-convergence implosions", Laser and Particle Beams, vol. 11, No. 1, 1993, pp. 89-96.
Nuckolls, John H., "The feasibility of inertial-confinement fusion", Physics Today, Sep. 1981, 9 pgs.
Nuckolls et al., "Future of Inertial Fusion Energy", 11th International Conference on Emerging Nuclear Energy Systems, 2002, 10 pgs.
Nuckolls et al., "Laser Compression of Matter to Super-High Densities: Thermonuclear (CTR) Applications", Nature vol. 239, Sep. 15, 1972, pp. 139-142.
Roth et al., "Fast Ignition by Intense Laser-Accelerated Proton Beams", Physical Review Letters, vol. 86, No. 3, Jan. 15, 2001, pp. 436-439.
Rozanov, V.B., "Laser-driven fusion: research on laser-target design and concepts at the Lebedev Physics Institute", Quantum Electronics 27 (12), 1997, pp. 1063-1073.
Smith et al., "Hydrogen in Metals", Physics Today, Sep. 1949, 4 pgs.
Ubbelohde, A.R., "Some Properties of the Metallic State. II. Metallic Hydrogen and Deuterium", Proceedings of the Royal Society, 1936, 9 pgs.
Velarde, et al., "Nuclear Fusion by Inertial Confinement, A Comprehensive Treatise", 1993, 745 pgs.
Winterberg, F., "The Possibility of Producing a Dense Thermonuclear Plasma by an Intense Field Emission Discharge", Physical Review, vol. 174, No. 1, Oct. 5, 1968, pp. 212-220.
Yabe, Takashi, "The Compression Phase in ICF Targets", Nuclear Fusion by Inertial Confinement: A Comprehensive Treatise, 1993, pp. 269-292.

* cited by examiner

HIGH-YIELD ICF CONTAINMENT CHAMBERS AND POWER REACTORS

CROSS REFERENCE

This application is a non-provisional, and claims the benefit, of commonly assigned U.S. Provisional Application No. 61/395,745, filed May 17, 2010, entitled "High-Yield Inertial Confinement Fusion Containment Chambers and Power Reactors," the entirety of which is herein incorporated by reference for all purposes.

This application is a non-provisional, and claims the benefit, of commonly assigned U.S. Provisional Application No. 61/395,762, filed May 17, 2010, entitled "ICF Targets With Directional Output and Altered Output Spectrums," the entirety of which is herein incorporated by reference for all purposes.

This application is a non-provisional, and claims the benefit, of commonly assigned U.S. Provisional Application No. 61/395,727, filed May 17, 2010, entitled "Laser-driven propellant drive for ICF targets," the entirety of which is herein incorporated by reference for all purposes.

This application is a non-provisional, and claims the benefit, of commonly assigned U.S. Provisional Application No. 61/395,725, filed May 17, 2010, entitled "X-Ray-Driven Propellant Drive ICF Targets," the entirety of which is herein incorporated by reference for all purposes.

This application is a non-provisional, and claims the benefit, of commonly assigned U.S. Provisional Application No. 61/395,726, filed May 17, 2010, entitled "Spherical Hohlraum Drive For ICF," the entirety of which is herein incorporated by reference for all purposes.

This application is a non-provisional, and claims the benefit, of commonly assigned U.S. Provisional Application No. 61/395,734, filed May 17, 2010, entitled "Shock-imploded ICF Targets," the entirety of which is herein incorporated by reference for all purposes.

BACKGROUND

Nuclear fusion refers to a type of reaction that occurs when two light nuclei combine to produce heavier nuclei and/or nuclear particles. A small amount of mass is lost in this process. According to the formula of mass-energy equivalence $E=mc^2$, this mass is converted to energy that is eventually converted into thermal energy in the material surrounding the reaction.

These reactions typically occur when a fusion fuel has been heated to a high enough temperature to form a plasma. The temperature at which a plasma under goes fusion varies depending on the type of material. Ignition occurs when a plasma of fusion fuel is heated to a high enough temperature that the fuel becomes hot enough to heat itself through self heating. That is, ignition occurs when the energy released from the fusion reaction exceeds the energy lost through other mechanisms (e.g., Bremsstrahlung radiation). The temperature at which this occurs is called the ignition temperature. For D-T fuel, the ignition temperature can range from 2-10 keV depending on the physical properties of the plasma. After ignition, self heating of the fuel can cause the fuel to rapidly reach ion temperatures of about 100 keV or more. This is often referred to as runaway burn.

Once the fuel has been ignited, confinement refers to the challenge of keeping the fuel from expanding and thus cooling and ceasing to burn long enough to produce the desired amount of energy. The reaction should produce significantly more energy than is used to ignite and confine the reaction.

While heating the fuel to ignition is simply a matter of delivering energy to it, confinement is more challenging. Currently there is no way to confine a plasma heated to ignition temperatures or above with a mechanical system. For instance, any solid containment mechanism that comes into contact with the fuel would become instantly vaporized and/or would drastically cool the plasma and quench the burn.

BRIEF SUMMARY

Embodiments of the invention are directed toward inertial confinement fusion ("ICF") reaction chambers for energy production. In some embodiments, an ICF chamber can include, a cylinder, a plurality of beam channels and a target insertion mechanism. The cylinder can be defined by an inner radius, an outer radius, a length, and two ends. The difference between the outer radius and the inner radius of the cylinder can be greater than 0.75 meters. The plurality of beam channels can be embedded or bored within the cylinder. The target insertion mechanism can be any configuration that can secure a target within a inner portion of the chamber.

A number of configurations of the chamber are disclosed. For example: The chamber can also include a cylindrical wall surrounding the cylinder. This wall may include two end caps at each end of the cylindrical wall. The wall may be configured to be a pressure vessel. The beam channels can be configured to allow laser beams to enter the cylinder through the beam channels and converge within the cylinder. The cylinder can be made from a graphite material. Radiation tiles can be coupled with the inside of the cylinder. Coolant channels can be disposed within the cylinder.

A number of additional configurations of the chamber are disclosed. For example: The difference between the outer radius and the inner radius can be greater than or equal to 1 m. Some of the plurality of beam channels are disposed cylindrically around the circumference of the cylinder. Tritium breeding mechanisms can be employed within the cylinder that may be filled at least in part with lithium. A sacrificial layer can be disposed on the inner surface of the cylinder. A plurality of injection nozzles disposed within the cylinder that can be included and configured to inject inert gas into the chamber. A plurality of injection nozzles can be included and configured to deposit a sacrificial layer on the inner surface of the chamber.

Some embodiments of the invention are directed to inertial confinement fusion reaction chambers that include a cylindrical inner vessel, two cylindrical outer vessels, and a plurality of beam channel. The cylindrical inner vessel can be defined by an inner radius, a length, a thickness, a central axis, and two ends. Each outer vessel can be defined by a length, an inner radius, a thickness, a central axis, and two ends. Each outer pressure vessel can be coupled with one end of the inner vessel such that the central axis of the inner pressure vessel is aligned with the central axis of the outer vessels. The plurality of beam channels can be bored within either or both the inner vessel or either of the outer vessels and can be angled to intersect at a point within the inner pressure vessel.

A number of configurations of the chamber are disclosed. For example: The radius of the outer pressure vessels can be less than the radius of the inner pressure vessel. The thickness of the inner vessel can be greater than 0.75 m. The thickness of the inner vessel can be greater than 1.0 m. Either or both the inner vessel or either of the outer vessels can be made from graphite. Radiation-absorbing plates can be disposed on the inner surface of either or both the inner vessel or either of the outer vessels. Coolant channels can be embedded within either or both the inner vessel or either of the outer vessels.

Tritium breeding mechanisms can also be disposed within any of the cylindrical vessels. Tritium breeding mechanisms can include channels formed within the cylinder filled at least in part with lithium. Debris silencing layers can be included.

The following detailed description together with the accompanying drawings will provide a better understanding of the nature and advantages of the present invention.

Figure 1:
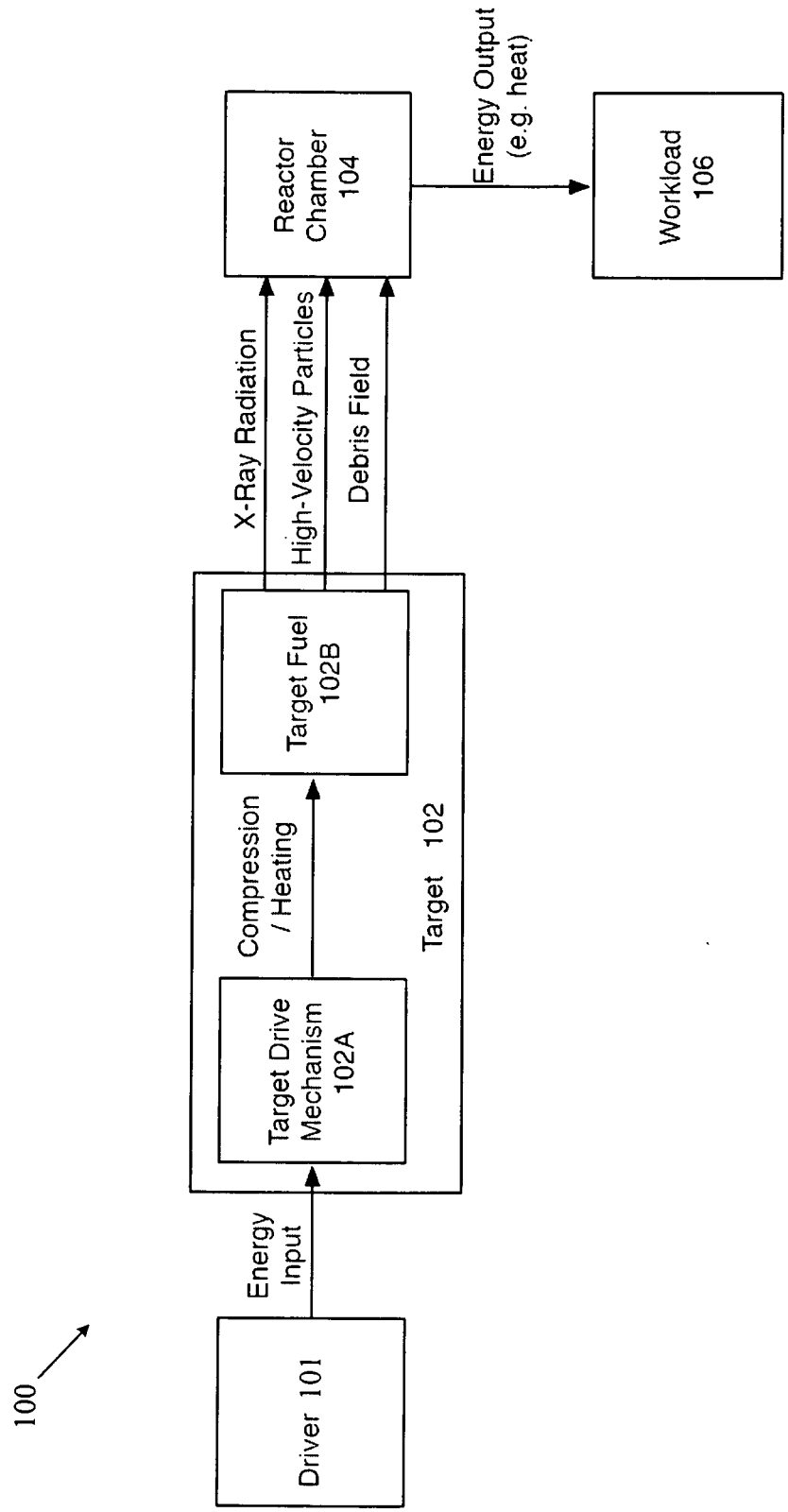
FIG. 1 is a block diagram of an inertial confinement reactor system that can use the target described herein.

These figures are not drawn to scale.

DETAILED DESCRIPTION

The various embodiments of the present invention are directed toward cylindrical inertial confinement fusion reactor chambers. Such chambers can be designed to contain an ICF target being imploded and capture the resulting energy output from the reaction in the form of neutrons, radiation, and/or debris. Such chambers can generally include a combination of neutron moderating, neutron absorbing, neutron shielding layers, radiation capturing layers, sacrificial layers, shock absorbers, tritium breeding layers, tritium breeders, coolant systems, injection nozzles, inert gas injection nozzles, sputterers, sacrificial coating injection nozzles, beam channels, target supporting mechanism, and/or purge ports, among others. Various Generally speaking, neutron moderating material can be constructed from graphite and may be naturally or artificially doped, combined, alloyed, and/or mixed with neutron absorbing material and/or have a thickness of one or more neutron mean free path lengths (e.g., 0.3-1.0 m). Neutron absorbing material may include boron, cadmium, lithium, etc. Radiation tiles or layers can be disposed throughout the chamber to absorb radiation from the reaction.

Such cylindrical chambers can be used with both directional and omni-directional targets. For instance, for use with directional targets where neutrons are not directed and radiations and debris are direct along the longitudinal length of the cylinder, a chamber can have neutron moderating and/or absorbing material concentrated near the center of the cylinder, and radiation and debris collecting material can be concentrated in the outer sections of the cylindrical chamber. Various other specific embodiments and configurations are described.

The term "isentropic drive mechanism" refers to a drive mechanism that is designed or utilized to compress material (such as fusion fuel) in an isentropic manner. "Isentropic" means compressing material while minimizing the total entropy increase (heating) of the material. Isentropic compression is therefore the most efficient way to compress material. When imploding a sphere or shell of material, such as an ICF target, isentropic compression requires that the drive mechanism deliver pressure to the material in a specific way over the entire duration of the compression, utilizing a low pressure initially that is increased over the course of the compression according to a mathematical formula. This can be difficult to achieve, and complicates the design of both the target drive mechanism and the driver that delivers energy to the drive mechanism (such as a laser or heavy ion beam).

The term "quasi-isentropic drive mechanism" refers to a drive mechanism that approximates an ideal, perfectly-isentropic compression using a means other than a ramped pressure profile. For instance, drive mechanisms that compress material by producing a series of shocks of increasing strength may approach the efficiency of a perfectly-isentropic compression. While in some circumstances simpler than perfectly-isentropic versions, these drive mechanisms are still complex to engineer.

The term "impulsive drive mechanism" refers to a drive mechanism that compresses material impulsively, typically by the production of a single shock wave that accelerates the material and causes it to move inward. The pressure produced by an impulsive drive mechanism is typically highest at the beginning of the implosion, and decreases afterward. Impulsive drive mechanisms are limited in the amount of compression they can produce and in the efficiency of compression achieved. They may be simpler to design and use than other drive mechanisms. For instance, an impulsive drive mechanism may not require that the driver (laser, heavy ion beam, etc.) be active during the entire course of the implosion, but may instead deliver its energy over a shorter timescale, potentially short comparable to the timescale of hydrodynamic motion in the target.

The term "shock" refers to sharp discontinuities in the flow of material. These discontinuities can be induced in any hydrodynamic variables such as temperature, pressure, density, velocity, etc.

The term "shock convergence" refers to the convergence of a shock which may travel from an outer shell and to an inner shell. It is calculated as the ratio of the outer radius of an inner shell, $R_c$, and the inner radius of an outer shell $R_o$. That is, $$SC = \frac{R_o}{R_c}.$$

For instance, given a first shell with an inner radius of 10 cm and given a second shell disposed within the first shell with a inner radius of 0.5 cm. In this configuration, the shock convergence is 20. Any other combination of inner and outer radiuses can be used.

The term "atom" refers to a particle of matter, composed of a nucleus of tightly-bound protons and neutrons, with an electron shell. Each element has a specific number of protons.

The term "neutron" refers to a subatomic particle with no electrical charge. Their lack of a charge means that free neutrons generally have a greater free range in matter than other particles. The term "proton" refers to a subatomic particle with a positive electrical charge. The term "electron" refers to a subatomic particle with a negative electrical charge, exactly opposite to that of a proton and having less mass than a proton and a neutron. Atoms under ordinary conditions have the same number of electrons as protons, so that their charges cancel.

The term "isotope" refers to atoms of the same element that have the same number of protons, but a different number of neutrons. Isotopes of an element are generally identical chemically, but have different probabilities of undergoing nuclear reactions. The term "ion" refers to a charged particle, such as a proton or a free nucleus.

The term "plasma" refers to the so-called fourth state of matter, beyond solid, liquid, and gas. Matter is typically in a plasma state when the material has been heated enough to separate electrons from their atomic nuclei.

The term "Bremsstrahlung radiation" refers to radiation produced by interactions between electrons and ions in a plasma. One of the many processes that can cool a plasma is energy loss due to Bremsstrahlung radiation.

The product "ρr" refers to the areal mass density of a material. This term refers to a parameter that can be used to characterize fusion burn. This product is expressed in grams per centimeter squared, unless otherwise specified.

The term "runaway burn" refers to a fusion reaction that heats itself and reaches a very high temperature. Because the D-T reaction rate increases with temperature, peaking at 67 keV, a D-T plasma heated to ignition temperature may rapidly self-heat and reach extremely high temperatures, approximately 100 keV, or higher.

The term "burn fraction" refers to the percentage of fusion fuel consumed during a given reaction. The greater the burn fraction, the higher the energy output.

The term "convergence" refers to how much a shell (or material) has been compressed radially during implosion. For instance, a shell that starts with a radius of 0.1 cm, R, and is compressed to a radius of 0.01 cm, $R_c$, during implosion has a convergence of 10. That is, $$C = \frac{R}{R_c}.$$

The term "high-Z material" is a material comprised of an element or elements that have an average number of protons greater than or equal to 48. The term "medium-Z material" is a material comprised of an element or elements that have an average number of protons less than 48 but greater than 5. The term "low-Z material" is a material comprised of an element or elements that have an average number of protons less than or equal to 5. A low-Z material can be a single material or an alloy of materials with an average number of protons less than or equal to 5.

Nuclear fusion refers to a type of reaction that occurs when certain atomic nuclei collide. In most of these reactions, two light nuclei combine, producing heavier nuclei and/or nuclear particles. In the process, some of the energy in the nuclear bonds holding the nuclei together is released, usually settling in the form of thermal energy (heat) in the material surrounding the reacting particles.

These reactions only occur between atomic nuclei that are very energetic, such as those that have been heated to a high temperature to form a plasma. The specific temperatures vary between reactions. The reaction between deuterium and tritium, two hydrogen isotopes, is generally considered to require the lowest temperature for ignition. As other fusion reactions require yet-higher temperatures, most nuclear fusion power concepts envision the use of D-T fuel.

Two challenges in using nuclear fusion to produce power are referred to as ignition and confinement. Achieving ignition requires heating a plasma of fusion fuel until it becomes hot enough to heat itself, meaning the energy released from fusion reactions exceeds the energy lost through various processes, such as Bremsstrahlung radiation and hydrodynamic expansion. The temperature at which this occurs is known as the "ignition temperature", which for D-T fuel can range from 2-10 keV, depending on the physical properties of the plasma. After ignition, self-heating in the fuel can cause it to reach temperatures of 100 keV or more.

Once fuel has been ignited, confinement refers to the challenge of keeping the fuel from expanding (thus cooling and ceasing to burn) long enough for it to produce the desired amount of energy: at least as much energy as was required to ignite it and keep it confined, and hopefully significantly more. While heating the fuel to ignition is simply a matter of delivering energy to it, confinement is more challenging. There is no way to confine a plasma heated to ignition temperature or beyond with a simple mechanical system. Any solid substance, such as the metal wall of a container, that comes into contact with a fusion plasma would either become instantly vaporized, or drastically cool the plasma and stop the burn itself, or both.

One method of confinement uses a magnetic field to keep the fuel from expanding. This is referred to as Magnetic Confinement Fusion. Magnetic confinement has many inherent difficulties and disadvantages, and economical power generation from an MCF facility appears decades away.

Another approach takes advantage of how the characteristics of fusion burn change with fuel amount and density. At ordinary densities and practicable amounts, a D-T plasma heated to ignition temperature will disassemble (expand and stop burning) before producing anywhere near the energy required to originally heat it. However, as the density of a given amount of fuel is increased, the rate at which the fuel will burn increases faster than the rate at which it will expand. This means that, if the fuel can be compressed sufficiently before heating it, the fuel's own resistance to motion (inertia) will keep it from expanding long enough to yield significant energy. This approach is referred to as Inertial Confinement Fusion ("ICF").

FIG. 1 is a block diagram of inertial confinement system 100. This system can use the various double shelled targets described in the many embodiments described herein. ICF System 100 can include driver 101 that can include such things as an array of laser or ion beams to deliver energy to target 102. Target 102 is often, but not necessarily spherical. Target 102 can include two components: target drive mechanism 102A, to which energy from the driver 101 is delivered; and target fuel 102B. Target drive mechanism 102A can be designed to use energy from the driver 101 to compress and heat target fuel 102B to high densities and/or temperatures causing ignition. Target fuel 102B can burn in a fusion reaction producing energy in the form of high-velocity subatomic particles, x-ray radiation, and an expanding debris field. These can be absorbed in target chamber 104, usually converted to heat, which can then be used in a standard thermal cycle to power workload 106, such as an electrical generating turbine. ICF system 100 can produce energy in a pulsed fashion, by repeatedly igniting and burning targets 102.

ICF system 100 is an example of an ICF system. While this system shows one specific configuration, many variations are possible. In some embodiments, ICF system 100 can use at least part of the energy produced by each target 102 to energize driver 101 for each additional shot, as well as to power workload 106. Additionally, some target chamber designs may capture energy produced by the targets using means other than or in addition to conversion to thermal energy, such as the direct conversion of the kinetic energy of charged particles to electricity. Furthermore, certain designs of target 102 may involve a more complex relationship between drive mechanism 102A and fuel 102B, or a simpler relationship in which both of these represent the same component.

Figure 2:
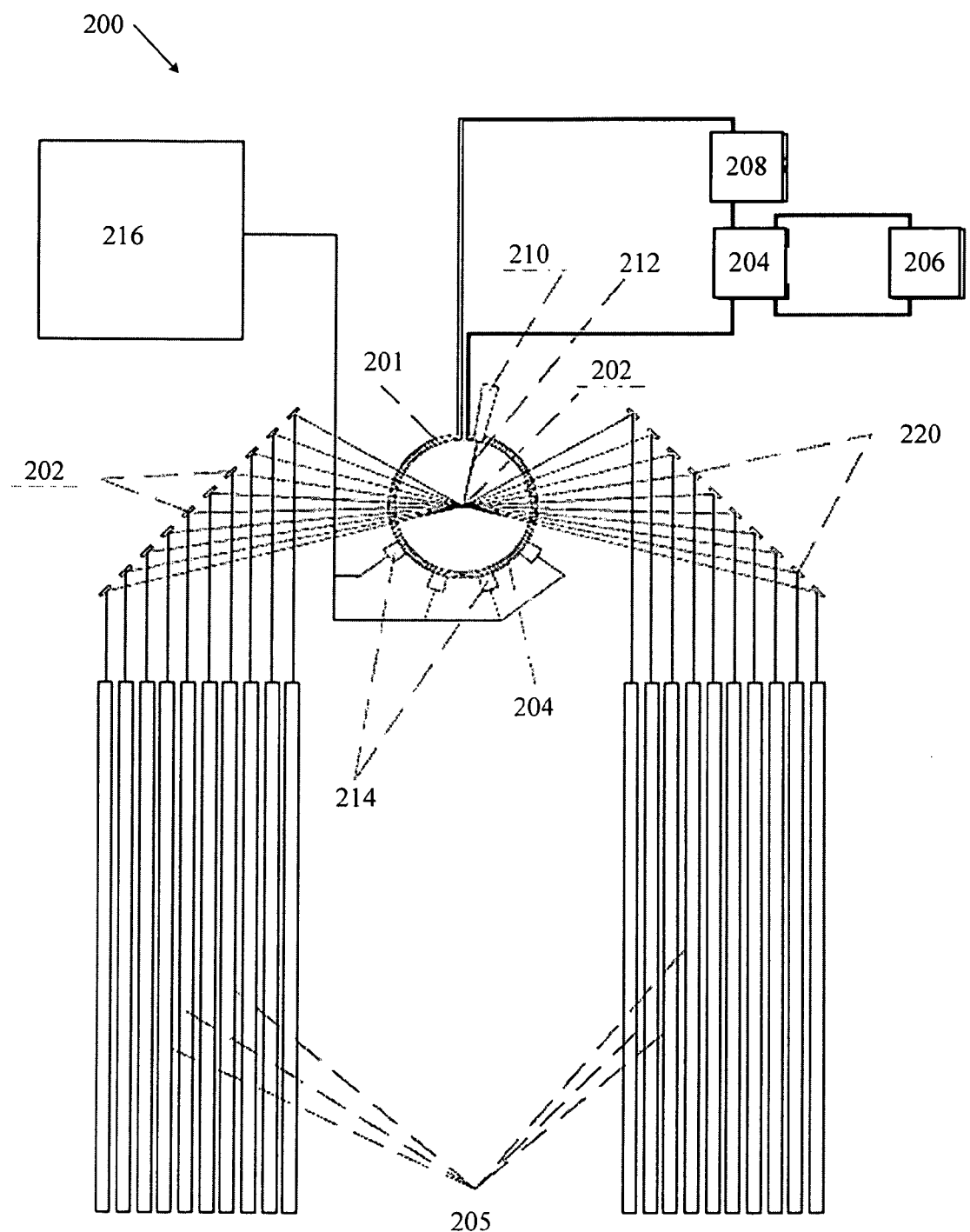
FIG. 2 is an example of an inertial confinement reactor system that can use the target described herein.

ICF power plant system 200 shown in FIG. 2 is an example of a generic ICF power plant system. Any other power plant systems may be used. In this system, targets 202 are ignited inside target chamber 201. The drive mechanism can include of a multitude of independent laser beam lines 205, producing laser beams which are directed into the target chamber 201 by an arrangement of beam-handling optics 202. Channels 204 in the walls of the reactor chamber 201 can carry a liquid lead-lithium eutectic coolant, which carries away the heat produced by burning of targets 202. After leaving the target chamber 201, the coolant can pass through a heat exchanger system 206, producing steam which can be used to power any industrial workload 206. Next, the coolant can pass through a tritium separation plant 208, which extracts tritium (produced from neutron reactions with the lithium), from the coolant.

High-speed insertion mechanism 210 can be used to insert targets into the chamber, in this illustration utilizing a disposable stalk 212. Exhaust pumps 214 maintain the required level of vacuum in the target chamber 201 for laser beams to propagate, and route the target debris extracted from the chamber to an exhaust handling system 216. The exhaust handling system 216 separates unburnt tritium from the other target debris. Along with the tritium separated from the coolant by the tritium separation plant 208, this tritium is used to fuel subsequent targets.

In addition to the production of energy, ICF systems can also be used to investigate physical processes that occur under conditions of extremely high temperature and pressure. ICF facilities used for research purposes, as well as prototype, demonstration, and experimental facilities, and other ICF facilities not used for commercial energy production, may not include some of the features shown on this diagram, such as the cooling system, tritium separation system, and debris handling system.

In a typical ICF target, approximately 70-75% of the energy is emitted as high-energy ("fast") neutrons produced by D-T fusion reactions directly, 6-22% as x-ray radiation produced by the high temperatures in the target during fusion burn, and 8-19% as kinetic energy in the debris. The exact distribution of this energy depends on the target configuration. Each of these components can cause damage to the target chamber in several ways.

Neutrons can damage structural materials by producing dislocations in the metal lattice, and transmuting atoms in the reactor wall to different elements. Both damage mechanisms compromise the material's structural integrity, for example, causing swelling, embrittlement, changes in the ductile-brittle transition temperature (DBTT), and introducing impurities in the material's chemical composition.

X-ray radiation can damage chamber wall material through heating. Excessive radiation flux can heat the wall material beyond its melting point, or vaporize and ablate off the inner surface of the wall.

The debris produced by the target can produce shocks in the chamber when it impacts the wall material. Shocks propagating through the chamber can producing spalling between material interfaces in the chamber, and disrupt the structural integrity of the chamber materials themselves. Once it has expanded to fill the entire chamber, the hot, low-density gas in the debris field will also exert a static pressure, which the chamber must be able to contain.

The force of material ablating off the wall surface due to x-ray heating may also drive shocks that can produce spalling and material damage.

In addition to remaining intact under these harsh conditions, an ICF reactor chamber may also perform additional duties. It can be used to evacuate or otherwise handle the debris produced by the targets being fired at the rate of several each second, including recovering the unburnt tritium present in the debris. It can provide a mechanism for introducing new targets to the chamber at the rate of several per second, in a manner that allows them to be precisely aligned with the drive mechanism. Additionally, as tritium is a radioactive material that is very scarce in nature and is prohibitively expensive to produce artificially for economic power generation, ICF reactors may contain tritium-breeding materials and recovery systems that use neutrons emitted by the target to produce enough tritium to replace that which is burnt with each shot.

Various schemes have been proposed to produce an ICF power plant reactor which can operate under these conditions. An overview of several reactor concepts can be found in: Gunther Kessler, Gerald L. Kulcinksi, and Robert R. Peterson. "ICF Reactors—Conceptual Design Studies. A Comprehensive Treatise". In: Nuclear Fusion by Inertial Confinement. Ed. by Guillermo Velarde, Yigal Ronen, and Jose M. Martinez-Val. Boca Raton, Fla.: CRC Press, 1993. Chap. 25. isbn: 0-8493-6926-6. In some target chambers, wall material is vaporized and re-condenses before the next shot. Other designs involve liquid metal flows or jets which surround the target and absorb the energy before it reaches the wall. These so-called "wetted wall" designs can in general handle a higher energy flux and operate with a lower exposed surface area, as well as to soften (shift to lower energy) the neutron spectrum and decrease the neutron flux on the first wall. The use of magnetic fields to shield the walls has also been proposed.

Some versions of the Cascade reactor concept consists of an approximately 5 m diameter conical reactor chamber, rotating at 50 rpm, utilizing a tritium breeding layer of lithium aluminate pellets that are held to the reactor wall by centripetal force. Targets are inserted into the chamber at 5 Hz and burnt, yielding 300 MJ each. The pellets are fed into the reactor by gravity through an insertion port near the axis of rotation, and migrate along the conical reactor wall. Energy recovery occurs through pellets being flung from the outermost part of the rotating chamber into a hopper, which contains heat exchangers to extract the thermal energy and equipment to extract tritium bred in the lithium aluminate pellets.

Conventional ICF targets produce output that is mostly uniform in angular distribution, and so conventional ICF target chambers are designed to contain isotropic output. This means that they are all roughly spherical in shape, or at least not significantly larger in one dimension than another.

All of these concepts are theoretical in nature, as the only actual ICF systems constructed have been experimental research facilities such as NIF, which do not attempt to produce useful amounts of power, achieve high repetition rates, or breed tritium. Actually designing, building and operating a safe, practical, reliable ICF power plant utilizing these concepts will require a long period of costly engineering effort. The neutron fluxes and neutron energies produced by ICF targets are higher than those produced in nuclear fission reactors, and thus outside the range in which significant materials engineering expertise exists. In Michael Moyer. "Fusion's False Dawn". In: Scientific American (2010), Mohamed Abdou, director of the Fusion Science and Technology Center at UCLA, estimates that if work were to begin immediately, it would take 30-75 years of effort on the tritium breeding blanket alone before the issues are understood well enough to begin construction on an actual power plant.

Figure 3:
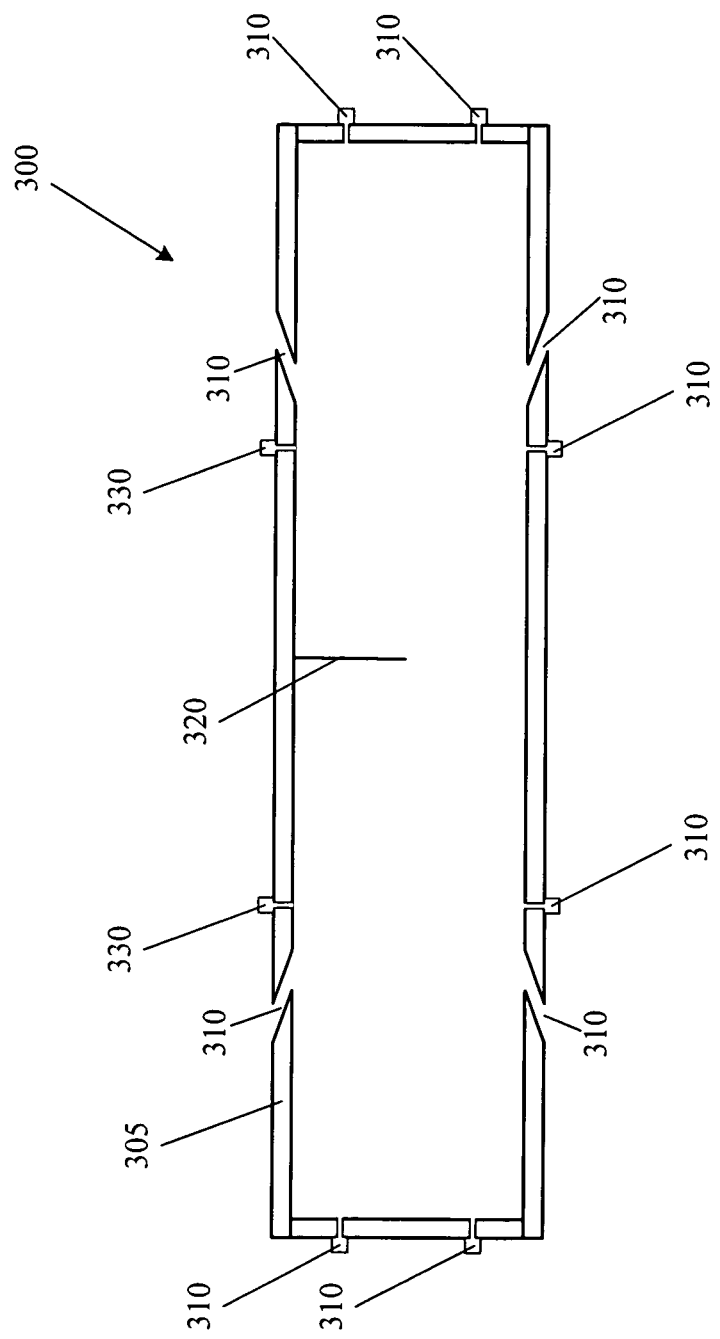
FIG. 3 is a high yield fusion chamber according to some embodiments of the invention.

A cylindrical fusion reaction chamber like the one shown in FIG. 3 (e.g., target chamber 201 in FIG. 2) is provided according to some embodiments of the invention. Chamber 300 can be used to contain a imploding ICF targets and capture the energy released from the reaction. Chamber 300 can have a generally cylindrical shape with closed ends and/ or can have various radii and/or lengths. Chamber 300 includes neutron moderating/absorbing material 305 that can be cylindrical and define the inner part of chamber 300. Neutron moderating/absorbing material 305 can be primarily used for neutron capture from a fusion reaction occurring within chamber 300, recovering energy from the neutrons through moderation, breeding tritium, and/or absorbing neutrons. Neutron moderating/absorbing material 305, for example, can be manufactured of graphite. Because of the long mean free path of neutrons from a fusion reaction, the thickness of neutron moderating/absorbing material 305 can be thick; for example, greater than 1 m thick. Neutron moderating/absorbing material 305 can include coolant channels that carry coolant through neutron moderating/absorbing material 305. This coolant can be used to extract heat from within the chamber.

Chamber 300 can include any number of manifolds 310 for various purposes. Some manifolds 310; for example, can be used to purge chamber 300 to create a vacuum. As another example, some manifolds 310 can be used for coolant delivery and collection. Manifolds 300 can be used for any number of purposes. Chamber 300 can also include beam ports 310. Beam ports 300 can be positioned and/or angled to direct laser energy toward the center of chamber 300. A target secured within chamber 300 using any number of mechanisms. Pole 320 is one example of a mechanism for securing a target. Chamber 300 can include tritium breeding devices. For example, chamber 300 can include channels having lithium, which is used for tritium production when bombarded with neutrons. Thus, the byproducts of fusion of fuel including tritium can be used to produce tritium for future targets.

Chamber 300 can also include various other confinement configurations, wall configurations, port configurations, manifold configurations, etc. In particular, chamber 300 can include any other configuration described herein.

Figure 4:
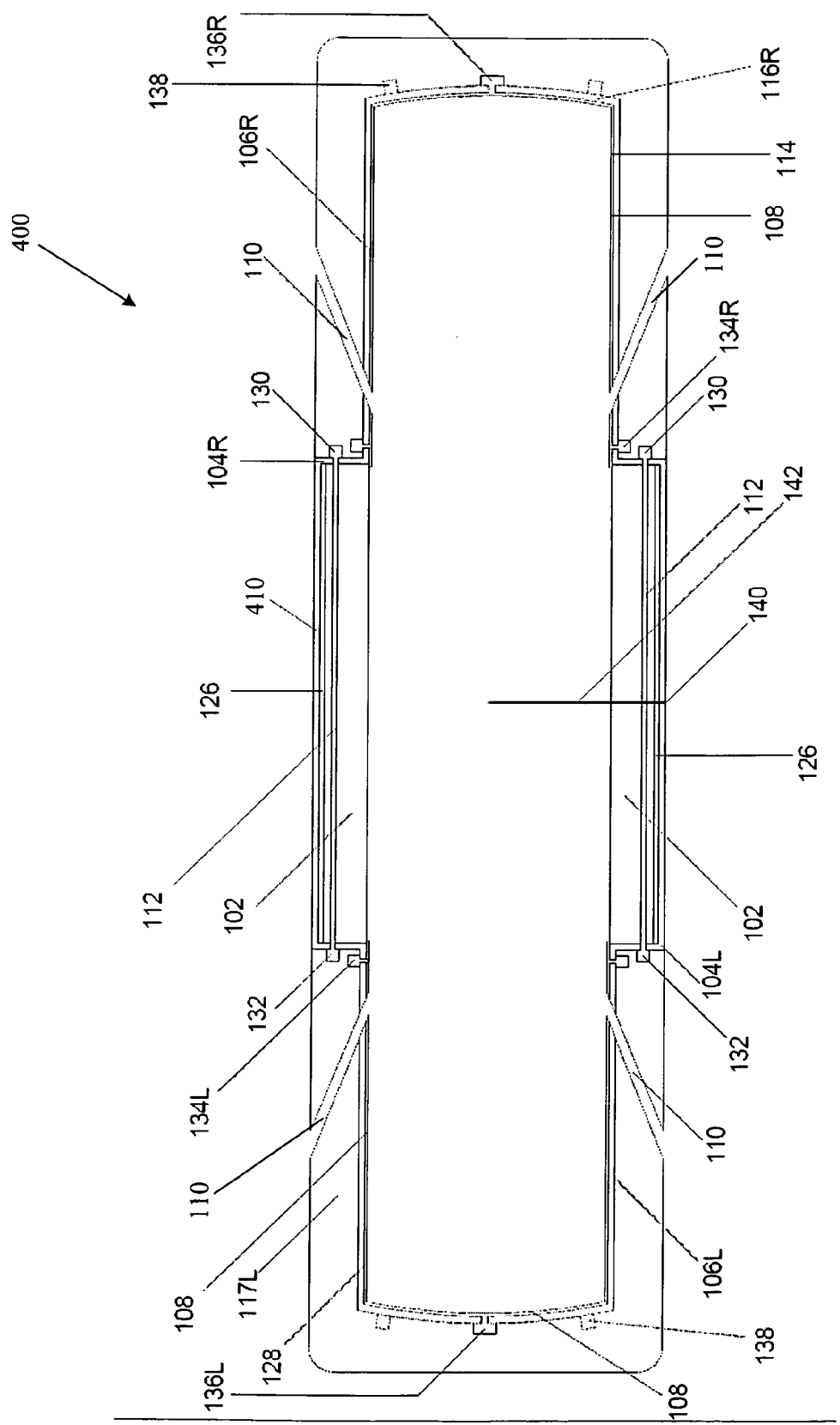
FIG. 4 is an example of another chamber according to some embodiments of the invention.
Figure 5:
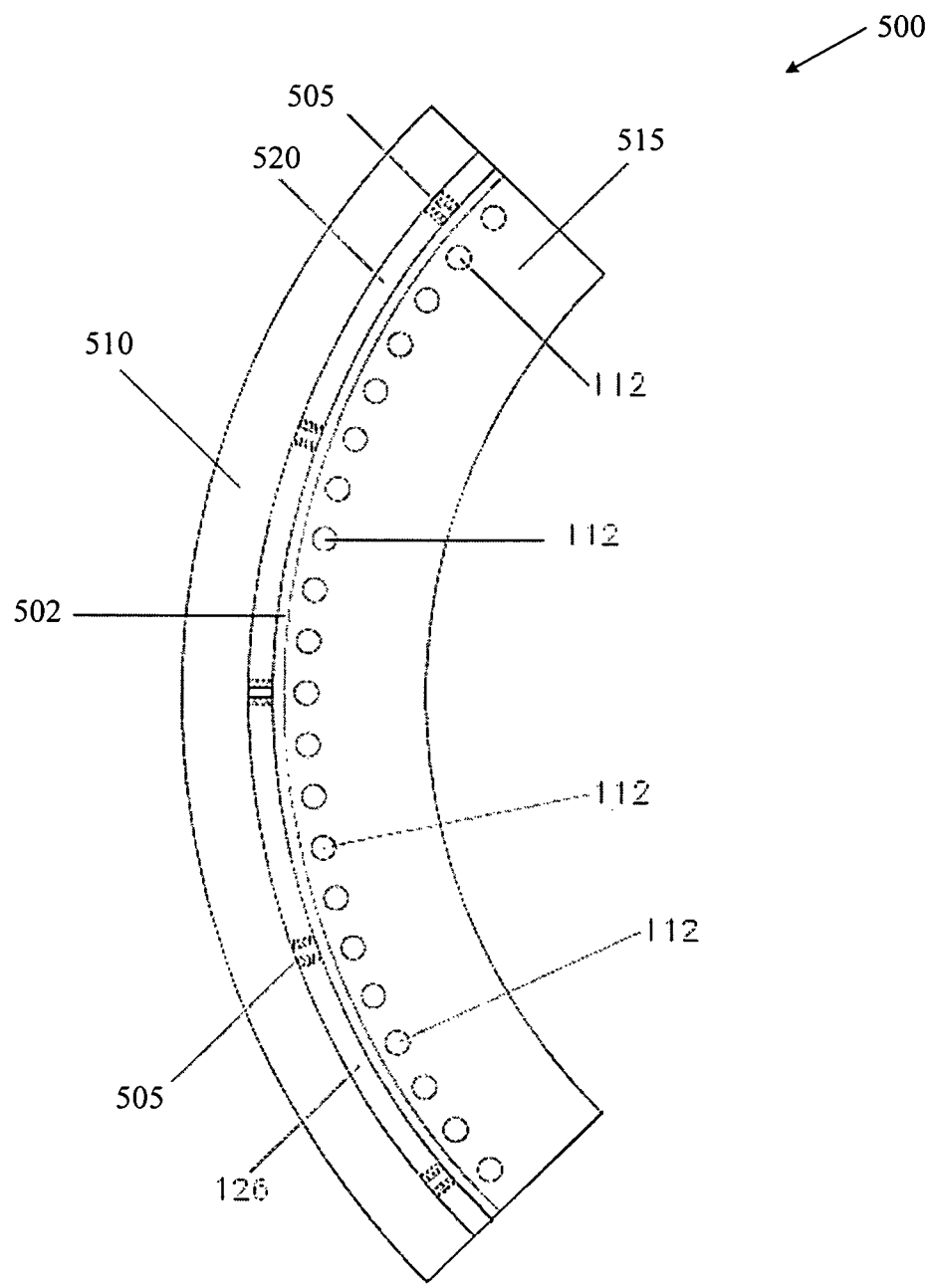
FIG. 5 shows partial end view cross-section of a chamber wall according to some embodiments of the invention.
Figure 6:
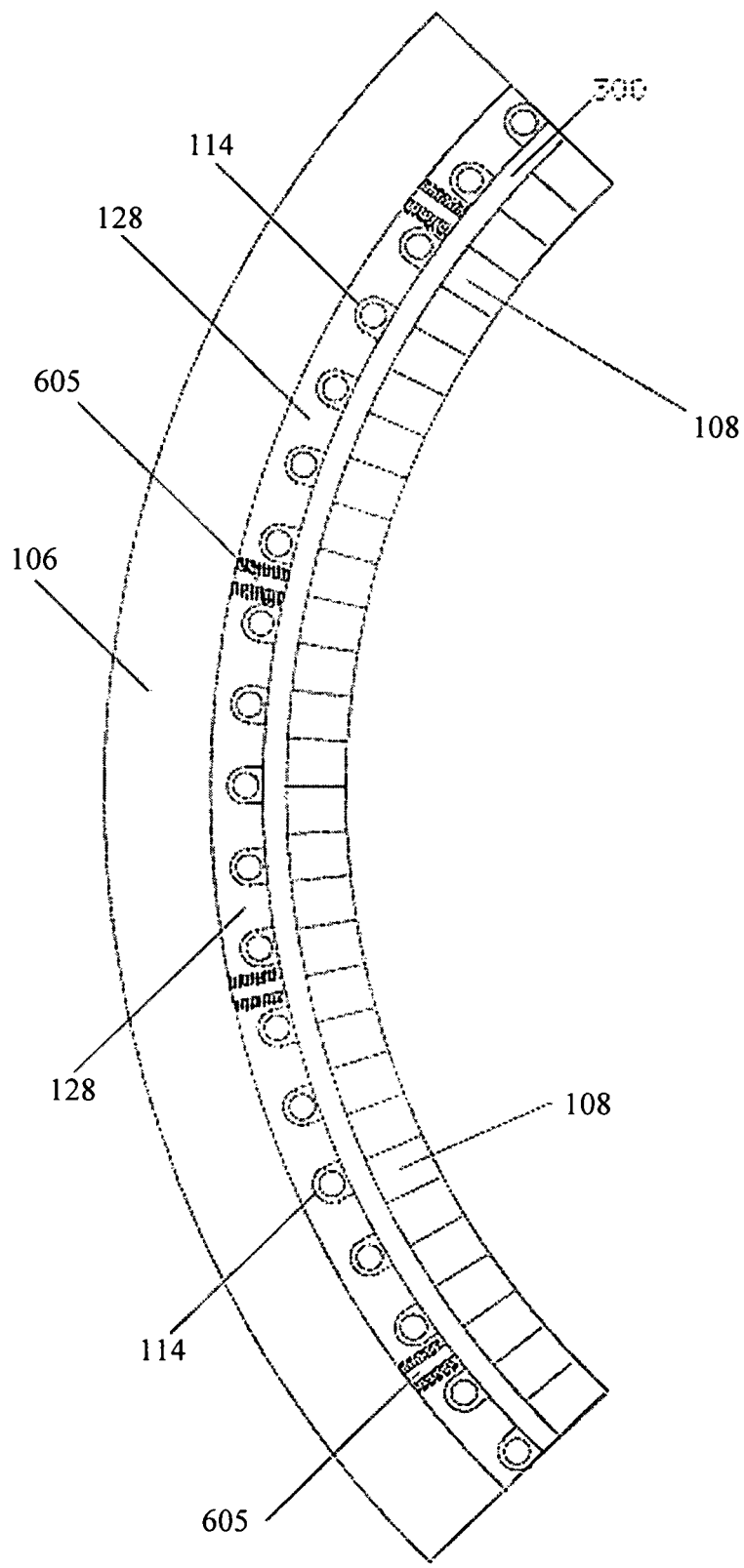
FIG. 6 illustrates a cross-section of a wall according to some embodiments of the invention.

FIG. 4 is an example of another chamber according to some embodiments of the invention. Chamber 400 can be generally cylindrically shaped. Chamber 400 includes inner pressure vessel 410 coupled with two outer pressure sections 106L, 106R. For example FIG. 5 shows some details of the inner sections of pressure vessel 410 and FIG. 6 shows some details of the outers sections of pressure vessel 410.

Returning to FIG. 4, outer pressure vessel sections 106L, 106R can be cylindrical sections that are attached to opposite sides of inner pressure vessel 410 by flanges 104L, 104R. Outer pressure vessel sections 106L, 106R can be constructed from various materials, for example, 316 stainless steel. In some embodiments, outer pressure vessel sections 106L, 106R, for example, can have an inner radius of 5 m and a thickness of 10 cm. Various other inner radii and thickness can be used. Hemispherical end caps 116L, 116R can be attached to the ends of outer sections 106L, 106R. End caps 116L, 116 R can be constructed with various materials and made in various sizes. For example, end caps 116L, 116R can be constructed from stainless steel. As another example, end caps 116L, 116R can have a thickness of 10 cm, with a radius of curvature of $\sqrt{5^2+25^2}=24.495$. A neutron shielding layer 117L, 117R can surround outer sections 106L, 106R and end caps 116L, 116R. For example, neutron shielding layer can be made from any material, for example, concrete or doped concrete, and/or can have various thicknesses, for example, a thickness of 1 m.

Radiation absorbing tiles 108 can be layered on the inside surface of the outer pressure vessel sections 106L, 106R. These tiles can have various thicknesses; for example, a thickness of 5 cm. In some configurations, radiation absorbing titles can be separated from the pressure vessel wall by air gap 128. Air gap 128, for example, can be about 10 cm. Radiation absorbing tiles can be constructed using any type of radiation absorbing material, such as graphite.

In some embodiments of the invention, air gaps are described. Any of these air gaps may or may not include air. For example, when a chamber is not evacuated air the air gap contains air. When the chamber is an evacuated chamber air gaps do not contain air.

Central cooling channels 112 run longitudinally through the neutron-absorbing blocks 102. Central cooling channels 112 can be constructed from a low activation material, for example, zirconium alloy. Ring-shaped input coolant manifold 130 and output coolant manifold 132 can be included on the outside of flanges 104L, 104R provide for inflow and outflow of coolant, such as water. Outer coolant channels 114 can run longitudinally on the outside of outer graphite layer 108. Ring shaped outer coolant input manifolds 134L, 134R can be used on the outside of the flanges 104L, 104R and can provide inflow of coolant into the outer channels 114, which are routed to the outer coolant output manifolds 136L/R on the outside of hemispheres 116L, 116R.

Any or all the coolant manifolds can be connected to external pumps and a heat exchanger system. Two neutron-absorbing rings 109L, 109R can be included to ensure there is sufficient shielding of various structural materials. For example, 1 m of graphite shielding can be used near flanges 104L, 104R and coolant manifolds 130 and 132 at the interface between the inner pressure vessel section 100 and outer pressure vessel sections 106L, 106R.

Beam ports 110 are formed within outer pressure vessel wall 106L, 106R. These beam ports can be bored through the outer pressure vessel walls. Beam ports 110 can be disposed on both sides of inner pressure vessel 410. Beam ports 110 can also be disposed around the circumference of outer wall 106L, 106R separated by 90° so that four beam ports are found around the vessel. In other embodiments 2 beam ports separated by 180° can be used. Beam ports 110 can be cylindrical channels with a diameter of about 10 cm and can be formed through the outer wall 106L, 106R and/or radiation-absorbing tiles 108. Beam port channels are angled such that their major axes intersect at or near the center of the inner pressure vessel 410. Beam ports 110 can be connected to the output stage of a drive mechanism for the ICF target. Drive mechanism can include a laser or particle beam.

FIG. 5 shows partial end view cross-section of chamber wall 500 (e.g., inner pressure vessel 410 or chamber 300). These walls can include an outer layer 510 that defines the exterior of the chamber or wall. Outer layer 510 can be made of a strong structural material such as 316 stainless steel.

Neutron moderating/absorbing layer 515 can be embedded within wall 500, disposed against the inner radius of outer layer 510, or separated by another layer from wall 500. Neutron moderating/absorbing layer 515 can be a material used to absorb and/or moderate neutrons from a fusion reaction occurring within chamber 400. Neutron moderating/absorbing layer 515 can have a thickness of 1 m. Neutron moderating/absorbing layer 515 can be made of a neutron moderating material, such as graphite and/or neutron absorbing material that has a high capture cross section (e.g., $^6$Li or boron). Neutron moderating/absorbing layer 515 can be attached to the inner surface of wall 500, separated by air gap 520. Air gap 520, for example, can be about 2 cm thick.

Central coolant channels 112 can be bored through neutron moderating/absorbing layer 515. In some configurations, these channels can be located in the outermost region of neutron moderating/absorbing layer 515. Each channel 112 can be constructed from a zirconium alloy tube with an inner radius of 2 cm, and an outer radius of 2.5 cm. Channels 112 can be separated by approximately 15 cm from each other. Neutron moderating/absorbing layer 515 can be mounted to a 1 cm thick cylindrical metal spall shield 502. Spall shield 502 can be suspended inside inner pressure vessel 410 and within air gap 126 by shock-absorbing mounts 400.

FIG. 6 illustrates a cross-section of another chamber wall (e.g., outer wall 106L, 106R) according to some embodiments of the invention. The figure also shows various geometries for disposing radiation-absorbing tiles 108 and coolant channel geometry. Tiles 108 can be mounted to a cylindrical metal heat spreader plate 505. In some embodiments, tiles 108 can be 5 cm thick. In some embodiments, heat spreader plate 505 can be 1 cm thick.

Outer coolant channels 114 run on the outside of the spreader plate 505. These channels, for example, can have an inner radius of 2 cm and/or an outer radius of 2.5 cm Channels 114 can have flat surfaces where they contact spreader plate 505. There can be approximately 1000 channels 114 around the circumference of the spreader plate 505. Spreader plate 505 can be suspended inside air gap 128 to outer pressure vessel section 106L, 106R by shock-absorbing mounts 302.

Evacuation pumps 138 can be located at the ends of outer pressure vessel wall 106L, 106R. Circular entrance port 140 can be manufactured through neutron-absorbing blocks 102 and can allow target 122 to be suspended in the center of the reactor at the end of a target insertion rod 142. Entrance port 140 can have a radius of 5 cm at the bottom of the inner pressure vessel section 100. Central coolant channels 112 can be routed around the port as it passes through neutron absorbing layer 515.

Figure 7:
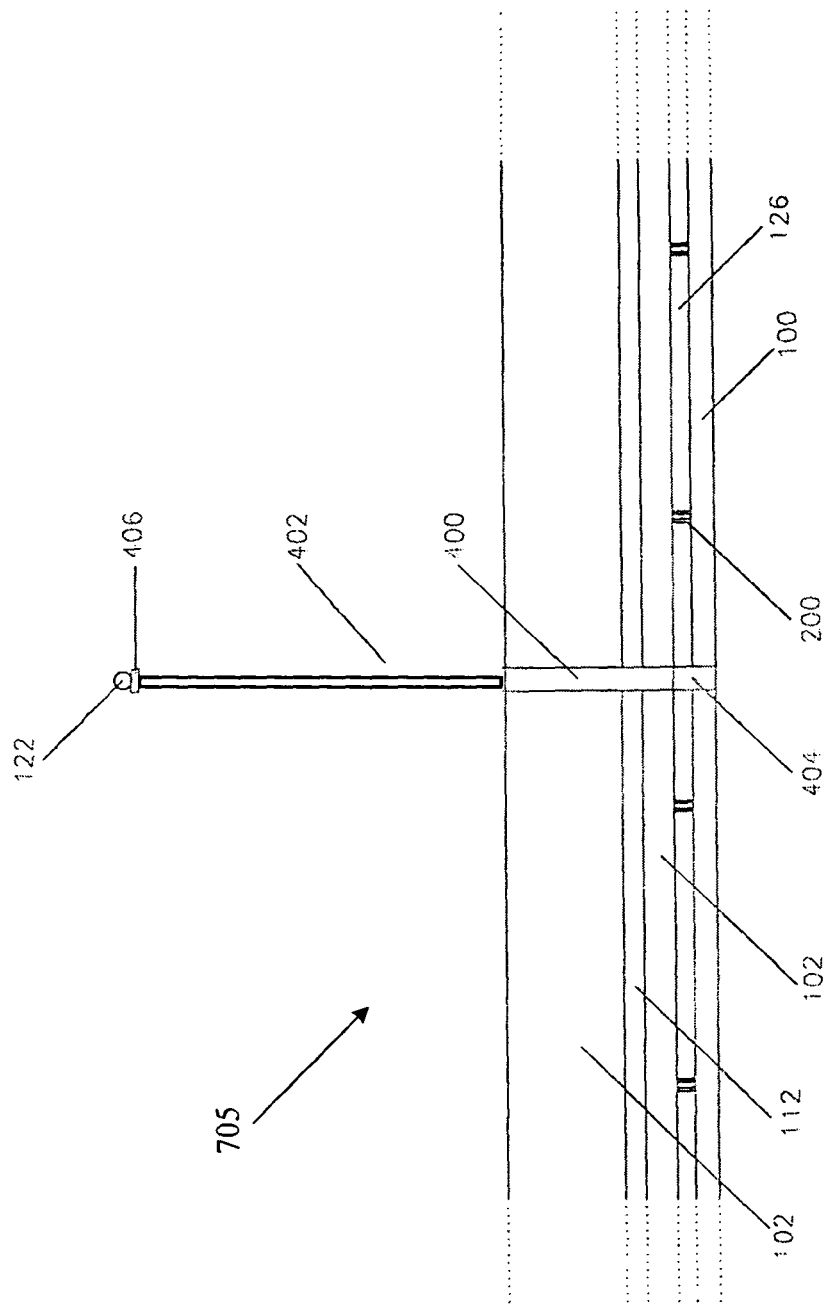
FIG. 7 is an insertion rod according to some embodiments of the invention.

An example of an insertion rod (e.g., insertion rod 142 shown in FIG. 4) is illustrated in FIG. 7. Insertion rod 705 can include a neutron-absorbing cylinder 400 that can be made of the same material as neutron absorbing layer 515. Insertion rod 705, for example, can be 1 m thick and have a 5 cm radius. Inner rod 402 can be mounted to cylinder 400, extending into the interior of the target chamber. Inner rod 402, for example, can extend about 5 m into target chamber, can have about a 1 cm radius, and/or can be made from zirconium alloy or other materials. Plastic sacrificial washer 406 can be disposed on top of rod 402. Sacrificial washer 406, for example, can have a 1 cm radius and/or can be 1 cm thick. Target 122 can be mounted on top of sacrificial washer 406. Shock absorber 404 can be situated below cylinder 400

The embodiment discussed in FIG. 4 is designed to contain a target with a total yield of 100 GJ. The energy output can be divided roughly as 20% in black-body radiation at 5 key, 30% in debris, and 40% in neutrons. The neutron output from the ICF target can be isotropic. And the debris and radiation output is directed in two lobes down the long axis of the cylinder.

In operation, target 122 can be attached with sacrificial washer 406 and mounted on top of rod 402. Port 140 is opened, and entire insertion rod 705 is inserted into the chamber. Port 140 is closed, and pumps 138 evacuate the chamber to the vacuum level needed for adequate drive beam propagation. At this point, the drive system may perform any final alignment necessary to correct for errors in the positioning of the target.

The drive system can then be fired. In doing so sufficient energy can be delivered to target 122 to ignite it. Neutrons are the first output products from the fusion reaction within target 122 to reach the inner wall of the reactor. The neutron moderating/absorbing layer 515 can encompass about 90% of the solid angle visible to target 122. Moreover neutron moderating/absorbing layer 515 can be sufficiently thick to stop neutrons up to 14 MeV before they can reach the structural material in inner pressure vessel wall 100. Energy deposited from neutrons collisions produces a temperature increase in neutron moderating/absorbing layer 515. For example, this layer can be cooled by coolant flowing through central cooling channels 112, and neutron moderating/absorbing layer 515 can operate at a temperature of approximately 500 K, with a temperature rise per shot of approximately 50K. The coolant in central cooling channels 112, for example, can run at about 400 K, carrying approximately 800 MW of power.

Neutrons that are emitted at an angle may not interact with neutron moderating/absorbing layer 515 or shield rings 109L, 109R. But these neutrons may pass through the radiation absorption tiles 108, which may be a large distance (e.g. 12 m) from the ICF target than the neutron moderating/absorbing layer 515, resulting in a lower average neutron power (e.g., lowering the average neutron power to 380 W/cm$^2$/s). While the 5 cm of radiation-absorbing tiles 108 are not sufficient to stop these neutrons, the neutron flux here can be well below acceptable limits on structural materials. The neutron-shielding concrete 117L, 117R outside the outer pressure vessel sections 106L, 106R prevents these neutrons from escaping the reactor.

Radiation is another output product of the target 122 to reach material on the inside of the reactor walls. Black-body radiation at 5 keV will be absorbed in the first few millimeters of neutron moderating/absorbing layer 515 and radiation-absorbing tiles 108, allowing a maximum radiation fluence of approximately 1000 J/cm$_2$ (at normal incidence) before vaporizing the graphite they are made from. Assuming target 122 produces radiation output at 5 keV, in an angular distribution such that each surface is subject to its maximum tolerable fluence (which can be corrected for non-normal incidence for surfaces distant from the target 122), the 20 GJ of radiation output can be contained without vaporizing the graphite.

At 1000 J/cm$_2$ of radiation flux, the surface of the graphite may reach a peak of approximately 2500 K with every pulse. This energy will diffuse through graphite tiles 108, and reach spreader plate 505, where it will then be carried away in the outer coolant channels 114. The radiation-absorbing tiles operate at an average temperature of 500 K, with a coolant temperature of approximately 400 K.

Finally, the expanding debris field will reach the graphite blocks 102 and tiles 108. Fast-moving debris that delivers an impulse on a faster timescale than the sound speed in the graphite can drive shocks into the graphite which may damage the cooling channels or the graphite itself. Spall shield 202 and/or spreader plate 505 can help prevent spallation as shocks exit the graphite, while air gaps 126 and/or 128 and shock absorbing mounts 505 and 605 isolate the pressure vessel walls from any shocks produced. The directional output of the debris reduces the strength of any shocks that will be produced by directing the debris field away from the near walls, giving the field time to expand, and thus increasing the timescale over which it will deliver its impulse. It can be beneficial for the target to have sufficient directionality in order to subject all surfaces in the reactor to a short-timescale impulse, which is the lower limit at which spallation may occur. In some embodiments, this may require directing approximately 75% of the debris output away from the near walls.

Once the debris field has expanded to fill the entire chamber, it can exert a static pressure on the pressure vessel walls of approximately 60 bar. The pressure vessel sections should be designed with enough strength to safely contain this pressure. The hot debris field will radiate energy into the graphite layers and reactor walls, which can be then transported away by the coolant channels.

Insertion rod 705 is retracted and the now destroyed target 122 and sacrificial washer 406 are replaced, as vacuum pumps evacuate the chamber in preparation for the next shot. By utilizing targets that can produce directional output, the reactor described in this embodiment can contain targets with higher yields than conventional reactors, without the massive increase in size that would be required of a conventionally-shaped, approximately spherical reactor. The ability to economically contain targets with high yield, for example, 100 GJ and above, can be beneficial for several reasons.

First, targets with high yield may require a lower repetition rate in order to produce the same power from targets with the same gain. A gigawatt plant utilizing 100 GJ targets (e.g., using the chamber and/or targets in the embodiment just described) would need to shoot a target just once every hundred seconds for a repetition rate of 0.01 Hz. In contrast, other conventional ICF reactors have a repetition rate of about 5 Hz. The delay of 100 seconds between shots, as opposed to a split second, greatly reduces the demands on the target insertion and alignment system, the drive mechanism, the debris evacuation pumps, and other systems.

Second, targets with high yield allow the use of larger targets. The higher $\rho r$ of larger targets generally translates into higher burn fractions and higher gains, and allows for lower overall convergences. High gains decrease the cost of power, as they correspond to an increase in energy produced by fusion burn for a constant energy delivered by the driver. The high $\rho r$ in these targets can also soften the neutron spectrum and decrease the neutron flux they produce, decreasing the amount of neutron damage to the reactor materials.

Third, the ability to contain large targets with high yield allows the use of targets that rely on fuels other than deuterium-tritium to produce substantial fractions of their yield, such as a lithium deuteride burning target. The high $\rho r$ required to produce acceptable burn fractions in these advanced fuels requires the use of large targets, which cannot be contained in a conventional ICF reactor.

These targets can be designed to breed tritium inside the targets themselves, decreasing or totally eliminating the need to include a complex tritium breeding scheme in the reactor design.

Fourth, the use of graphite shielding protecting the structural reactor wall allows the neutron fluence and spectrum on the reactor wall to be reduced to arbitrarily low levels. Together, all of these advantages translate into a simpler, more economical reactor design than conventional ICF approaches.

Many aspects of the embodiment discussed above can be altered. It can be scaled up to handle targets with higher yields (or targets that do not produce their yield in the optimal directional as described above), or scaled down to handle targets with lower yields. Multiple variations of the cooling channel type and geometry can be used, as well as the possibility of using coolants other than water. Various configurations of vacuum pumps and or target insertion mechanisms may be used.

The inner pressure vessel 410 can be lengthened in order to increase the fraction of neutrons captured in neutron moderating/absorbing layer 515. Outer pressure vessel sections 106L, 106R can be lengthened in order to increase the surface area available for radiation absorption.

The materials mentioned are merely specific examples of the materials one might choose in constructing embodiments of this invention. Graphite was chosen for the neutron-moderating blocks 102 because of its favorable thermal conduction and low neutron activation cross-section, but other materials are suitable as well. Graphite was also chosen for radiation-absorbing tiles 108 because it has a low opacity to high-energy radiation, allowing radiation to penetrate deeper into the material and distribute the resulting temperature increase over a larger area. A zirconium alloy can be chosen for materials that experience a significant neutron flux (e.g., the central cooling channels 112 and/or target positioning rod 142), as it has a low rate of neutron activation. Metal (e.g. a zirconium alloy) plates or structures inside can be included within the neutron moderating/absorbing layer 515 so as to increase the rate of thermal conduction into the central cooling channels 112. Various other materials may be used without limitation.

In some embodiments of the invention a reactor can be used to contain targets with a higher fraction of energy output in debris, or a poorer degree of debris directionality, such that the neutron-absorbing blocks near the target will be subject to a higher impulse over a short timescale than the approximate limit of 500 taps. Such a reactor can be similar to the reactor described in other embodiments, with a cylindrical debris silencer layer 500 added on the inside surface of neutron-absorbing blocks 102, as illustrated in FIG. 6.

Figure 9:
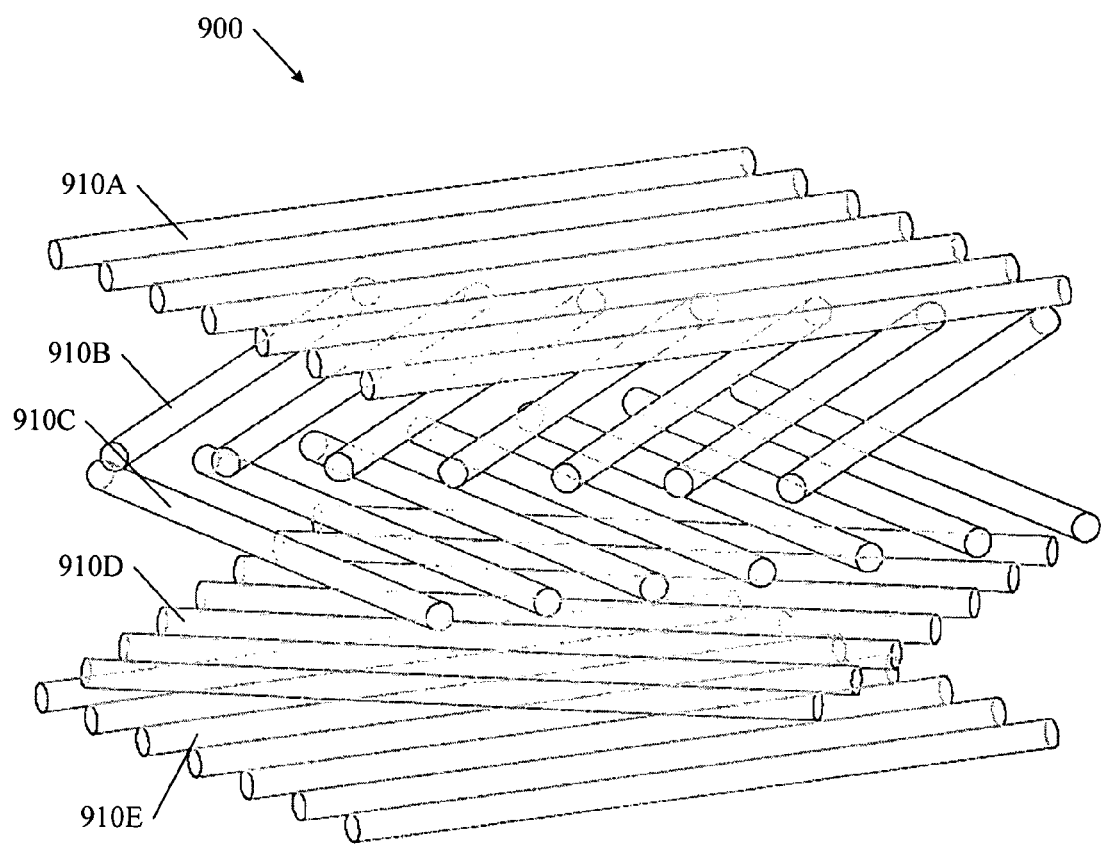
FIG. 9 shows a debris silencer layer according to some embodiments of the invention.
Figure 10:
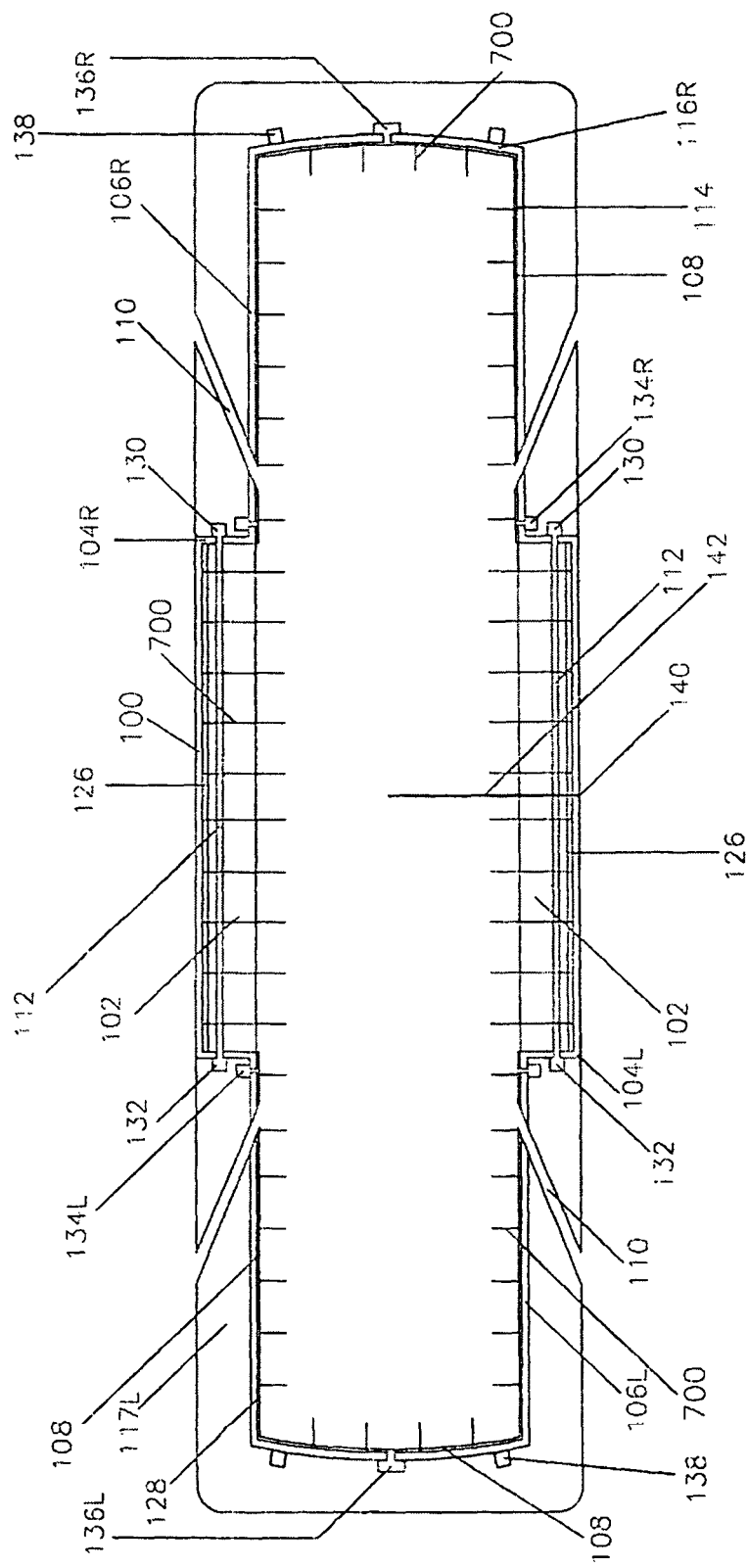
FIG. 10 is a cross-section of a chamber including gas injection nozzles configured to deposit a sacrificial layer on the inner surface of the chamber according to some embodiments of the invention.

Debris silencer layer, for example, can be made from the structure illustrated in FIG. 9. It can include 5 overlapping screens 610 of metallic wires. These screens, for example, can be manufactured from zirconium alloy, can have a 1 mm in diameter, and/or can be spaced 8 mm apart. The screens can be aligned with second layer 610B, which is rotated 45 degrees from first (innermost) layer 600A, the third layer 610C is rotated 90 degrees from first layer 610A, the fourth layer 610D is rotated 135 degrees from first layer 610A, and fifth layer 610E is aligned with the first layer 610A, but offset by 4 mm in one direction. Turbulent flow between the screen layers can dissipate kinetic energy in the expanding debris, transforming it into internal energy and thereby increasing the timescale over which the debris impulse can be delivered to the near walls.

The screens can be manufactured with zirconium alloy, which can withstand high neutron flux. Other materials can be used. Variations of this embodiment may utilize this silencer layer in other areas of the reactor chamber, or utilize screens with different wire dimensions and/or spacings, fewer or more screens, or other shock-suppression means besides overlapping screens. Other silencer layer structures are possible.

Figure 8:
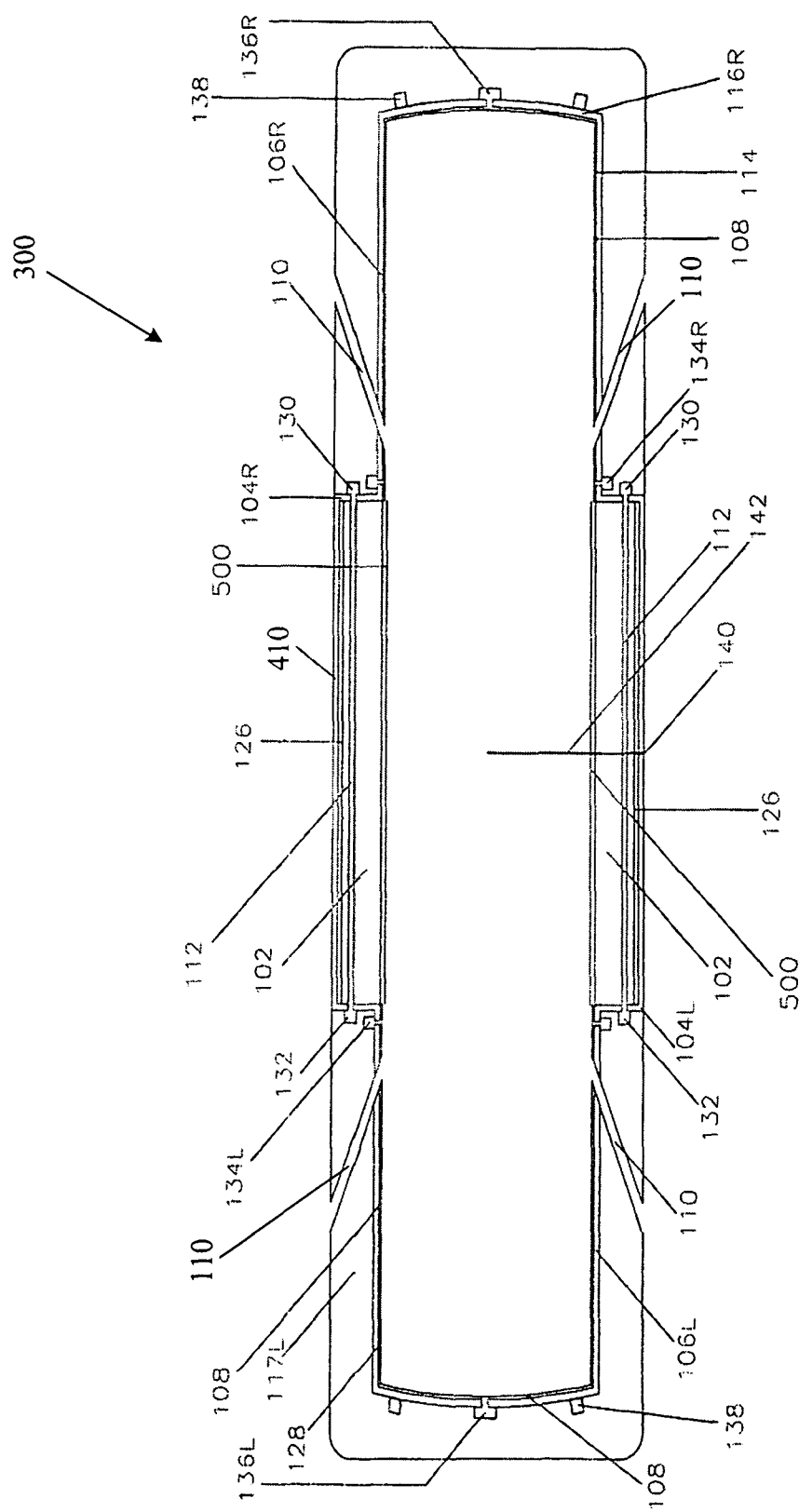
FIG. 8 is a cross-section of a reactor that allows the use of targets that have poor radiation directionality according to some embodiments of the invention.

FIG. 8 shows a reactor according to some embodiments of the invention that allows the use of targets that have poor radiation directionality. That is, they leak a significant fraction of their output as isotropic radiation. In some embodiments of the invention, can be similar to other embodiments, (e.g., the reactor shown in FIG. 3 or FIG. 4), but with a sacrificial layer that is disposed within the inner wall of the chamber. This sacrificial layer can be a light metal, such as aluminum. In some embodiments, the sacrificial layer can be sputtered onto the walls by a series of retractable coaters 800. This metal is intended to be ablated off the walls with each shot, thereby allowing a higher wall fluence and permitting the use of targets with poor radiation directionality without requiring an undesirably large chamber radius. For example, coaters 800 can be arranged in groups of 4 coaters, 90° apart, with each group separated by 2 m lengthwise.

The sacrificial layer may only need to be thick enough to protect the graphite surface on the near walls from ablation. However, it may be useful to keep the wall fluence below levels that will generate an ablative-driven shock, which will damage the structural wall material in the same manner as debris impact.

The sacrificial layer can also allow the use of targets that produce black-body radiation at less than 5 keV, without increasing the size of the reactor chamber. Sacrificial layer does not need to be uniformly deposited over the entire inner surface of the chamber. For example, coaters 700 can be arranged in such a manner as to deposit the sacrificial layer 702 only in regions where the wall fluence is expected to be higher, or the radiation temperature is expected to be lower, than graphite can withstand. This technique can be used to correct for targets with a largely optimal radiation spectrum, but with predictable, localized "hot spots" of higher radiation fluence than is desired.

Figure 11:
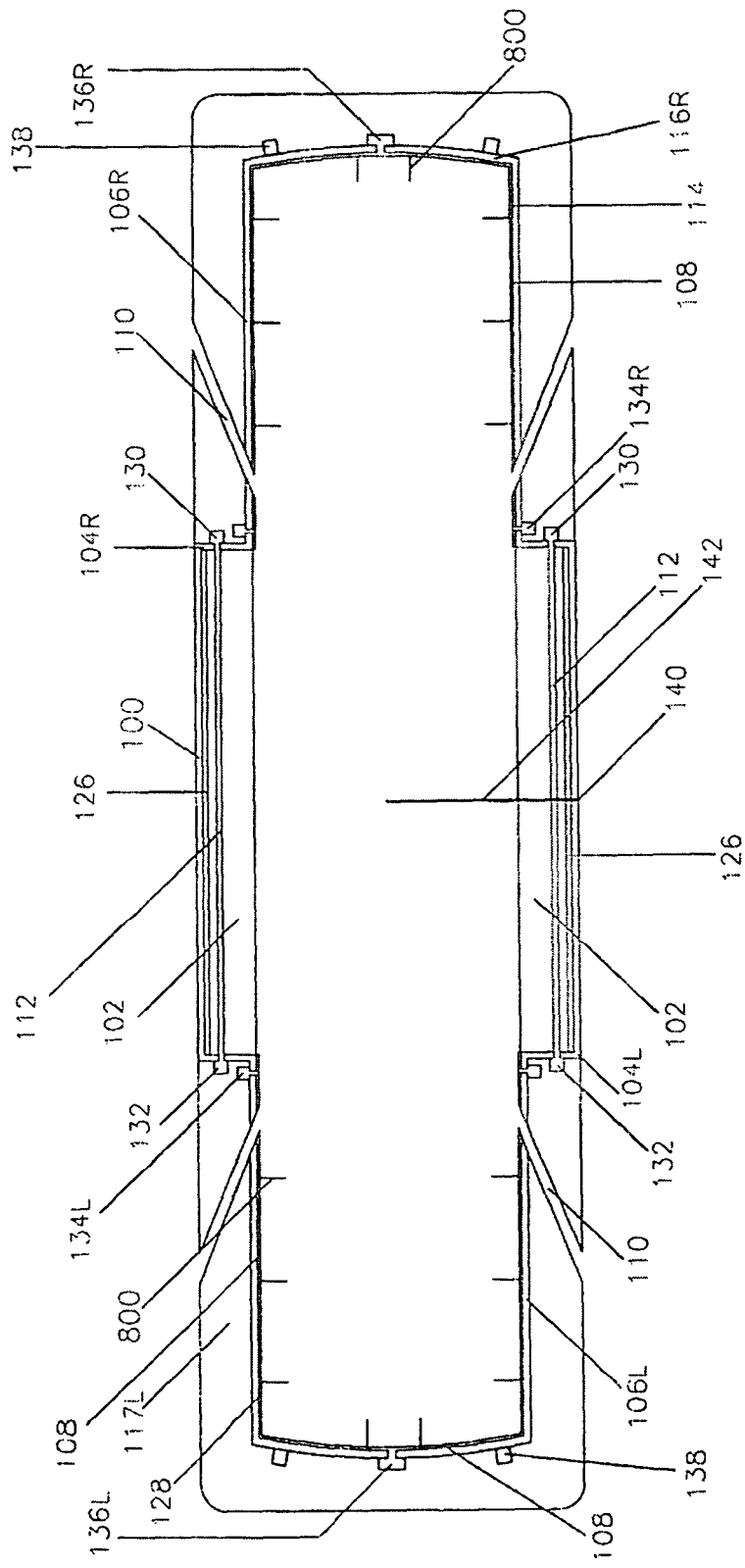
FIG. 11 is a cross-section of a chamber including gas injection nozzles configured to inject an inert gas into the chamber according to some embodiments of the invention.

In some embodiments of the invention, a reactor chamber can include gas injection nozzles positioned throughout outer pressure vessel. In such embodiments, the reactor chamber can be similar to any of the other chambers described herein with gas injection nozzles as shown in FIG. 11. In particular, gas injection nozzles 800 can be located within outer pressure sections 106L, 106R. Before each target is fired, these nozzles can inject an inert gas into the chamber, such as xenon, argon, or helium. The gas can fill outer pressure sections 106L, 106R with the gas at a small fraction of atmospheric density. The gas may be injected in sufficient volume to fill the outer sections 106L, 106R to the desired density before significant gas reaches the beam propagation paths. The gas density is chosen so as to slow the debris and absorb radiation output, heating the gas and causing it to re-radiate the absorbed energy on a longer timescale. This allows a chamber of a given volume to contain targets of a higher yield and/or fraction of output in debris and radiation than they would otherwise, by decreasing the instantaneous debris and radiation fluence on the wall.

In some embodiments, the reactor chamber can be filled with helium, or another inert gas, at approximately ¼ to ½ atmospheric density. This gas can be used, for example, with a 100 GJ target that produces 90% of its yield in directional radiation. In operation, the target is ignited, and its radiation output is entirely absorbed over the length of the chamber in the helium. This heats the helium to a high temperature. The energy in the helium can be recovered as it radiates and conducts energy into the walls, or by running the high-pressure helium gas through a turbine.

Some classes of targets produce a lower amount of energy in neutrons than other targets. If such targets are used within a chamber, then the size of the neutron-absorbing blocks 102 can be decreased and/or the number of central coolant channels 112 decreased to account for the decreased neutron flux.

It is possible to scale these embodiment to handle targets with yields significantly greater than 100 GJ. For instance, a reactor following approximately the same general configuration as the first embodiment, but with an inner pressure vessel section 100 inner radius of 11 m, an outer pressure vessel section radius of 10 m, and a total length of all sections of 100 m, may contain a target producing approximately 200 GJ in directional prompt radiation output, 400 GJ in isotropic neutron output, and 500 GJ initially in debris, for a total yield of 1 TJ. Dimensions of cooling channels, the thickness of the radiation-absorbing plates 108, and other details may need to be adjusted in order to make such a chamber perform optimally.

Another embodiment of this invention can include the same reactor configurations described in conjunction with the other embodiments, but with the neutron-absorbing blocks 102 replaced with or in conjunction with tritium-breeding material, such as lithium aluminate pellets, lithium titanate blocks, flowing liquid lithium, or any configuration of materials designed for tritium breeding. Such embodiments can be designed for use with a target that is thick to neutrons, producing 100 GJ of total output with 85% in directional debris, 10% in radiation, and 5% in isotropic quasithermal neutrons. The target debris is presumed to be directed towards the ends of the cylinders, where as in other embodiments it is slowed by injected gas before impacting the walls, while the quasithermal neutrons enter the tritium breeding material inside the inner pressure vessel section 100 and breed tritium.

Various embodiments of the invention describe spherical targets with various shells or layers. Any of these targets and/or any of the related components alone or in combination may be manufactured intentionally non-spherical in order to correct for known asymmetry in the drive mechanism and/or driver energy deposition. Deviation from a perfect sphere in any or all target components due to acceptable manufacturing tolerances and/or manufacturing error may be acceptable and/or tolerated.

The specific embodiments presented are intended to be representative examples of how different embodiments might be utilized by one skilled in the art. Generalizations and expressions of preferences were made to assist in understanding how different parameters of the design interact. It is expected that anyone skilled in the art utilizing this disclosure may make use of detailed numerical simulations, as are used in the design of all modern ICF targets, to assist in understanding the trade-offs involved and the behavior of embodiments with differing materials and dimensions.

The design formulas and operational results (yields, gains, timescales, output spectrums, etc.) of the specific embodiments discussed above were determined by hand calculations, and/or the use of a one-dimensional Lagrangian radiation hydrodynamics code utilizing three-temperature radiation diffusion with the Dyson opacity approximation for bound-bound and bound-free transitions, the D-T, D-D, and D-$^3$He fusion reactions, and a Thomas-Fermi equation of state with cold pressure correction. These calculations and results are presented to aid those skilled in the art in understanding the characteristics of the embodiments described, and in understanding the criteria considered useful for designing additional embodiments. It is expected that calculations and simulations involving different physical models and/or approximations may not exactly replicate the results described here, and that the use of more accurate simulations or physical experiments can aid in producing an optimized design.

The term black-body radiation is used to describe a radiation distribution that is qualitatively close to an ideal black-body distribution. In practice, no material is a perfect black-body radiator.

Various embodiments of the invention are described in terms of specific characteristics such as having various shells, radii, layers, mechanisms, lengths, materials, densities, dimensions, etc., that are described by ranges or with specific examples. The characteristics of such embodiments can be scaled outside the ranges provided while preserving the characteristics of the invention and/or without deviating from the spirit and scope of the invention. For example, radii may be scaled upwards or downwards, densities may vary, materials may change, yet such changes are within the described embodiments of the invention. Thus, the mention of specific ranges or examples of such characteristics does not constrain, construe, and/or limit the scope of the invention.

While advantages and characteristics of certain embodiments are mentioned, this should not be interpreted as a requirement that all embodiments display these advantages or characteristics.

The previous description provides embodiments only, and is not intended to limit the scope, applicability, or configuration of the disclosure. Rather, the previous description of the embodiments will provide those skilled in the art with an enabling description for implementing one or more embodiments. It is understood that various changes may be made in the function and arrangement of elements without departing from the spirit and scope of the invention. Several embodiments were described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the previous description to provide a thorough understanding of the embodiments. However, it will be understood by one of ordinary skill in the art that the embodiments may be practiced without these specific details.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have also included additional steps or operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

While detailed descriptions of one or more embodiments have been give above, various alternatives, modifications, and equivalents will be apparent to those skilled in the art without varying from the spirit of the invention. Moreover, except where clearly inappropriate or otherwise expressly noted it should be assumed that the features, devices, and/or components of different embodiments may be substituted and/or combined. Thus, the above description should not be taken as limiting the scope of the invention.

What is claimed is:

1. An inertial confinement fusion reaction chamber comprising:
   a target insertion mechanism for positioning a directional target, wherein the directional target is configured to produce:
      a first type of emission primarily in a first direction; and
      a second type of emission primarily in a second direction;
   a cylindrical pressure vessel with an outer wall comprising:
      a first material positioned within the pressure vessel to receive the first type of emission from the directional target in the first direction;
      a second material positioned within the pressure vessel to receive the second type of emission from the directional target in the second direction; and
      a third material, the third material comprising a neutron absorption layer disposed within the pressure vessel; and
   a plurality of beam channels embedded within the outer wall of the pressure vessel.

2. The inertial confinement fusion reaction chamber according to claim 1 wherein the axial length of the cylindrical pressure vessel is 2 times the diameter of the cylindrical pressure vessel.

3. The inertial confinement fusion reaction chamber according to claim 1 wherein the axial length of the cylindrical pressure vessel is 5 times the diameter of the cylindrical pressure vessel.

4. The inertial confinement fusion reaction chamber according to claim 1, wherein the neutron absorption layer has a thickness of 0.2 to 1.5 m.

5. The inertial confinement fusion reaction chamber according to claim 1 further comprising radiation tiles coupled with the inside of the neutron absorption layer.

6. The inertial confinement fusion reaction chamber according to claim 1 further comprising coolant channels disposed within the a neutron absorption layer.

7. The inertial confinement fusion reaction chamber according to claim 1, wherein the neutron absorption layer comprises a neutron moderating material with a neutron absorbing material.

8. The inertial confinement fusion reaction chamber according to claim 1, wherein the beam channels are angled towards the directional target.

9. The inertial confinement fusion reaction chamber according to claim 1, wherein the difference between the outer radius and the inner radius of the cylindrical pressure vessel is 0.2 to 1.5 m.

10. The inertial confinement fusion reaction chamber according to claim 1, wherein some of the plurality of beam channels are disposed cylindrically around the circumference of the cylinder.

11. The inertial confinement fusion reaction chamber according to claim 1 further comprising a tritium breeding mechanism.

12. The inertial confinement fusion reaction chamber according to claim 11, wherein the tritium breeding mechanism comprises channels formed within the pressure vessel that are filled at least in part with lithium.

13. The inertial confinement fusion reaction chamber according to claim 1 further comprising a sacrificial layer disposed on the inner surface of the cylinder.

14. The inertial confinement fusion reaction chamber according to claim 1 further comprising a plurality of injection nozzles configured to deposit a sacrificial layer on the inner surface of the chamber.

* * * * *